US012632341B2

(12) United States Patent
Ponnuswamy et al.

(10) Patent No.: US 12,632,341 B2
(45) Date of Patent: May 19, 2026

(54) SYNTHETIC COPY GENERATION USING AN ANOMALY DETECTION ENGINE

(71) Applicant: Dell Products L.P., Round Rock, TX (US)

(72) Inventors: Senthil Ponnuswamy, San Jose, CA (US); Kiran Kumar Malle Gowda, Bangalore (IN); Harsh C Kolhatkar, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/890,340

(22) Filed: Sep. 19, 2024

(65) Prior Publication Data

US 2026/0079795 A1     Mar. 19, 2026

(51) Int. Cl.
*G06F 11/1446* (2026.01)
*G06F 11/14* (2026.01)

(52) U.S. Cl.
CPC ...... *G06F 11/1451* (2013.01); *G06F 11/1435* (2013.01)

(58) Field of Classification Search
CPC ........................ G06F 11/1451; G06F 11/1435
See application file for complete search history.

(56) References Cited

U.S. PATENT DOCUMENTS

| | | | |
|---|---|---|---|
| 7,266,655 B1 * | 9/2007 | Escabi | G06F 11/1448 |
| | | | 707/999.204 |
| 8,255,998 B2 * | 8/2012 | Claudatos | G06F 21/568 |
| | | | 707/648 |
| 2024/0345928 A1 * | 10/2024 | Rakesh | G06F 3/067 |

* cited by examiner

*Primary Examiner* — Bryce P Bonzo
*Assistant Examiner* — Audrey Emma Whitesell
(74) *Attorney, Agent, or Firm* — Chamberlain, Hrdlicka, White, Williams & Aughtry; Aly Z. Dossa

(57) ABSTRACT

A method for generating synthetic copies of data associated with an application. The method also includes making a first determination that a first copy of the data comprises: a first anomalous file, a second anomalous file, and a plurality of non-anomalous files. In addition, the method includes obtaining, in response to the first determination, a most recent prior clean version of the first anomalous file from a backup application, wherein the most recent prior clean version of the first anomalous file is associated with a first backup copy of the data. Moreover, the method includes obtaining a most recent prior clean version of the second anomalous file from a backup application, wherein the most recent prior clean version of the second anomalous file is associated with a second backup copy of the data. Finally, the method includes generating a first synthetic copy of the data using the most recent prior clean version of the first anomalous file, the most recent prior clean version of the second anomalous file, and the plurality of non-anomalous files.

17 Claims, 5 Drawing Sheets

SYNTHETIC COPY GENERATION USING AN ANOMALY DETECTION ENGINE

BACKGROUND

Application data is often backed up to safeguard against data loss in the event of system failure. However, backups are often plagued by anomalies within the application data.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

DETAILED DESCRIPTION

As cyber threats become more frequent and data dependency grows, the need for a reliable data recovery system becomes increasingly crucial. Traditional data recovery systems frequently backup data to maintain the most current versions for recovery. The data often includes anomalous files and non-anomalous files. These systems often scan the data for anomalous files prior to backup. If an anomalous file is detected, the entire backup process is halted, consequently leading to a failure in the entire backup (which includes the non-anomalous files). This can result in a loss of crucial, non-anomalous files. Therefore, there is a pressing demand for enhanced data recovery systems that ensure the preservation of all of the non-anomalous files, even in the presence of isolated anomalies.

As a result of the limitations of traditional data recovery systems discussed above, embodiments of the invention are directed to a data recovery system that is able to intelligently identify and stitch the most recent non-anomalous versions of anomalous files with the most recent non-anomalous files in order to provide the most up to date files in a backup.

The following describes one or more embodiments.

Figure 1:
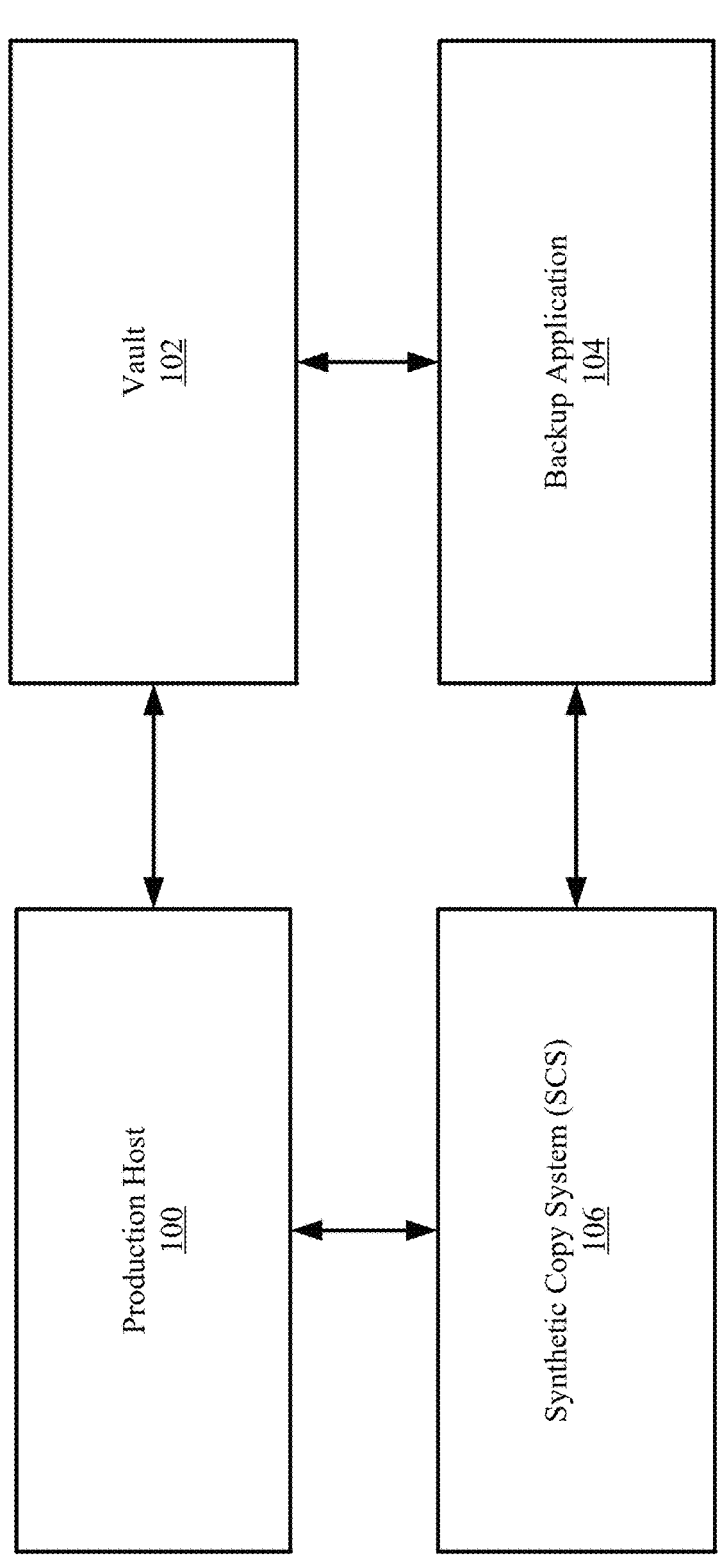
FIG. 1 shows a diagram of a system in accordance with one or more embodiments.

FIG. 1 shows a system in accordance with one or more embodiments. The system may include a production host (100), a vault (102), a backup application (104), and a synthetic copy system (SCS) (106). The system may include additional, fewer, and/or different components without departing from the scope of the invention. Each of these system components is described below.

Though not shown in FIG. 1, the aforementioned components may be operatively connected through a wired and/or wireless network (e.g., a local area network (LAN), a wide area network (WAN) such as the Internet, a mobile network, any other network type, or a combination thereof). Further, the network may encompass various interconnected, network-enabled subcomponents (or systems) (e.g., switches, routers, gateways, etc.) that may facilitate communications between the aforementioned components.

Moreover, the aforementioned components may communicate with one another using any combination of wired and/or wireless communication protocols.

In other embodiments, the production host (100), the vault (102), the backup application (104), and/or the SCS (106) may be located on a single physical and/or logical computing system.

In one or more embodiments, the production host (100) includes functionality to host applications. The production host (100) may host any number of applications that provide application services. Application services may include, but are not limited to database services, electronic communication services, instant messaging services, file storage services, etc.

In one or more embodiments, application data from an application hosted on the production host (100) may be backed up to the backup application (104). The application data may include metadata (e.g., file paths) and application files (e.g., one or more files related to the application) produced or used by the application hosted on the production host (100). Further, the application data may be backed up fully (i.e., a backup capturing all of the most recent application files) or incrementally (i.e., a backup only capturing the application files that have changed since the last backup). Further, the production host (100) includes functionality to perform at least a portion of the method shown in FIG. 3. One of ordinary skill will appreciate that the production host (100) may perform other functionalities without departing from the scope of the invention.

In one or more embodiments disclosed herein, the production host (100) may be a physical device (see e.g., FIG. 5) such as, e.g., a laptop, a cell phone, a tablet computer, a server, etc. In another embodiment of the invention, the production host (100) may be implemented on a virtual device (e.g., a virtual machine executing on one or more physical devices).

In one or more embodiments, the vault (102) includes functionality to store and lock the application data. In one or more embodiments, the vault (102) prevents the application data from being modified or deleted for a retention period (i.e., a specified period). It should be appreciated, that any retention period may be used, e.g., seven days. It should be further appreciated, that the application data may be continuously stored in the vault (102). In a non-limiting example, if the vault (102) has a retention period of seven days, a copy of the application data stored in the vault (102) will include at least seven days' worth of the application data. In one or more embodiments, the vault (102) may lock the application data using immutable storage. The immutable storage may include a write-once-read-many protocol that ensures the application data cannot be modified or deleted once written (i.e., stored on the vault (102)). It should be appreciated, that any methods known in the art or discovered in the future may be used to lock the application data in the vault (102). In one more embodiments, the vault (102) may be air-gapped (i.e., only connected to the aforementioned components when transferring the application data). It should be appreciated, that air-gapping will protect the vault (102) from cyber threats.

The vault (102) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF)

device, resistive RAM (ReRAM), persistent memory (PMEM), virtualized storage, and virtualized memory.

In one or more embodiments disclosed herein, the vault (102) may be hosted on a physical device (see e.g., FIG. 5) or a virtual device. Further, the vault (102) includes functionality to perform at least a portion of the method shown in FIG. 3. One of ordinary skill will appreciate that the vault (102) may perform other functionalities without departing from the scope of the invention.

In one or more embodiments, the backup application (104) includes functionality to copy, transfer, and store the application data from the applications hosted on the production host (100). In one or more embodiments, the backup application (104) also includes functionality to store the application data locally and/or store it in the vault (102). It should be appreciated, that the backup application (104) may maintain references to all of the application data stored in the vault (102). In one or more embodiments, the backup application (104) also includes the functionality to rehydrate (i.e., restoring a copy of the locked application data back to its original useable form) the application data locked on the vault (102) for recovery and operational purposes. Further, the backup application (104) includes functionality to perform at least a portion of the method shown in FIG. 3. One of ordinary skill will appreciate that the backup application (104) may perform other functionalities without departing from the scope of the invention.

The backup application (104) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory.

In one or more embodiments disclosed herein, the backup application (104) may be hosted on a physical device (see e.g., FIG. 5) or a virtual device. Further, the backup application (104) includes functionality to perform at least a portion of the methods shown in FIG. 3. One of ordinary skill will appreciate that the backup application (104) may perform other functionalities without departing from the scope of the invention.

In one or more embodiments, the SCS (106) includes functionality to generate a synthetic copy from a set of backup data. In one or more embodiments, the set of backup data may include two or more backups of the application data. Further, the SCS (106) includes functionality to perform at least a portion of the method shown in FIG. 3. One of ordinary skill will appreciate that the SCS (106) may perform other functionalities without departing from the scope of the invention. Additional details about one or more embodiments of the SCS are described below in FIG. 2.

In one or more embodiments disclosed herein, the SCS (106) may be a physical device (see e.g., FIG. 5) such as, e.g., a laptop, a cell phone, a tablet computer, a server, etc.). In another embodiment of the invention, the SCS (106) may be implemented on a virtual device (e.g., a virtual machine executing on one or more physical devices).

Figure 2:
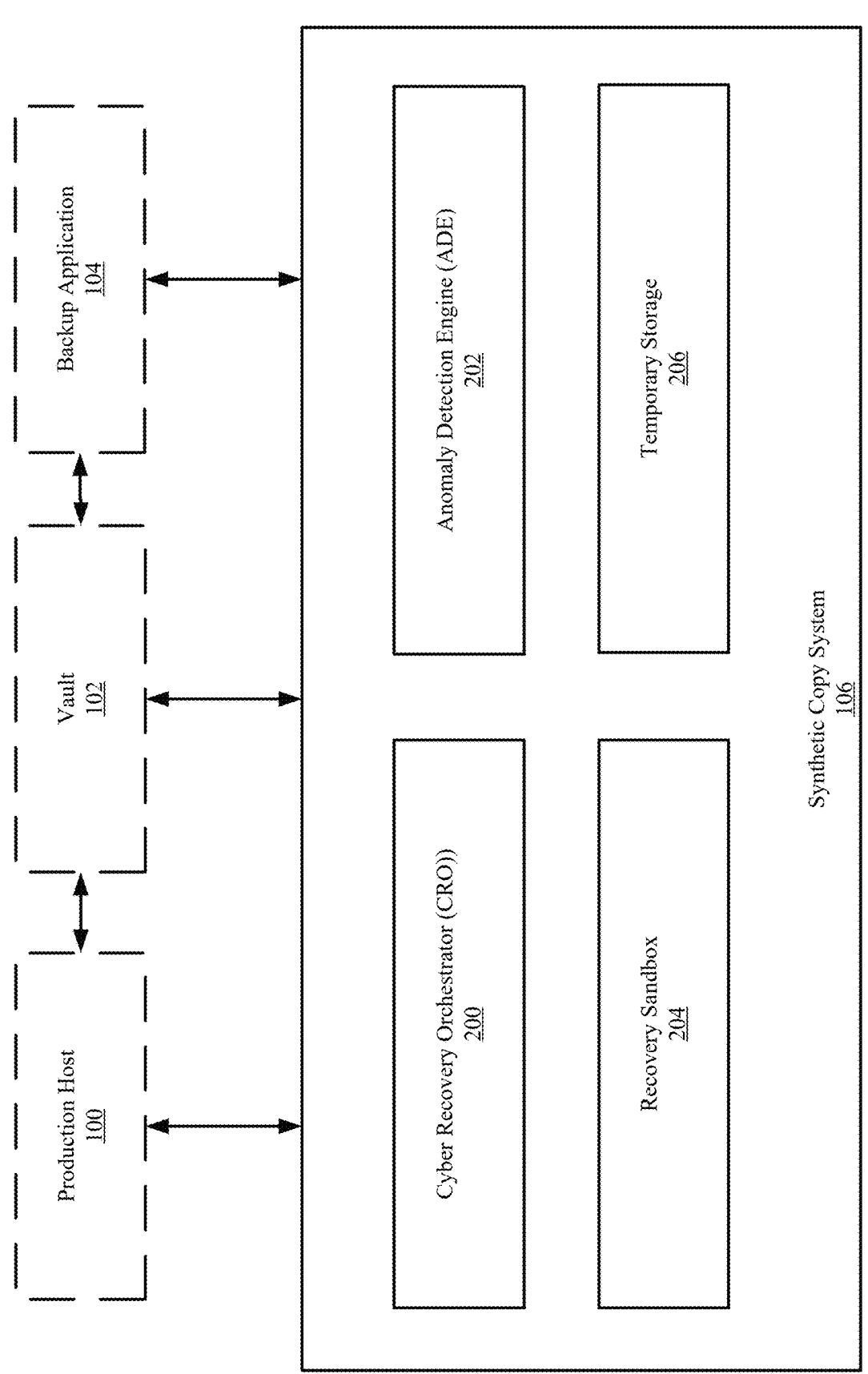
FIG. 2 shows a diagram of a synthetic copy system in accordance with one or more embodiments of the invention.

FIG. 2 shows a SCS (e.g., 106 in FIG. 1) in accordance with one or more embodiments of the invention. More specifically, in one or more embodiments of the invention, the SCS (e.g., 106 in FIG. 1) includes a cyber recovery orchestrator (CRO) (200), an anomaly detection engine (ADE) (202), a recovery sandbox (204), and temporary storage (206). Each of these components is described below.

In one or more embodiments, the CRO (200) includes functionality to manage interactions between the components in FIGS. 1-2 as described below in FIG. 3. Further, the CRO (200) includes functionality to perform at least a portion of the method shown in FIG. 3. One of ordinary skill will appreciate that the CRO (200) may perform other functionalities without departing from the scope of the invention.

In one or more embodiments, the ADE (202) includes functionality to scan the application data for anomalous application files (e.g., infected files, corrupted files, etc.). It should be appreciated, that any methods known in the art or discovered in the future may be used to scan the application data. Further, the ADE (202) includes functionality to perform at least a portion of the method shown in FIG. 3. One of ordinary skill will appreciate that the ADE (202) may perform other functionalities without departing from the scope of the disclosure.

In one or more embodiments, the recovery sandbox (204) includes functionality to provide an environment to facilitate one or more actions (e.g., file stitching, compatibility testing, etc.) performed by the components in FIGS. 1-2 as described below in FIG. 3. In one or more embodiments, the recovery sandbox (204) may be an isolated environment (i.e., a secure space that has no bearing on other components of a system). Additionally, the recovery sandbox (204) may use the temporary storage (206) when facilitating the actions described below in FIG. 3. Further, the recovery sandbox (204) includes functionality to perform at least a portion of the method shown in FIG. 3. One of ordinary skill will appreciate that the recovery sandbox (204) may perform other functionalities without departing from the scope of the disclosure.

In one or more embodiments, the temporary storage (206) includes functionality to store data (e.g., prior non-anomalous version of the anomalous application files). The temporary storage (206) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. Further, the temporary storage (206) includes functionality to perform at least a portion of the method shown in FIG. 3. One of ordinary skill will appreciate that the temporary storage (206) may perform other functionalities without departing from the scope of the invention.

Figure 3:
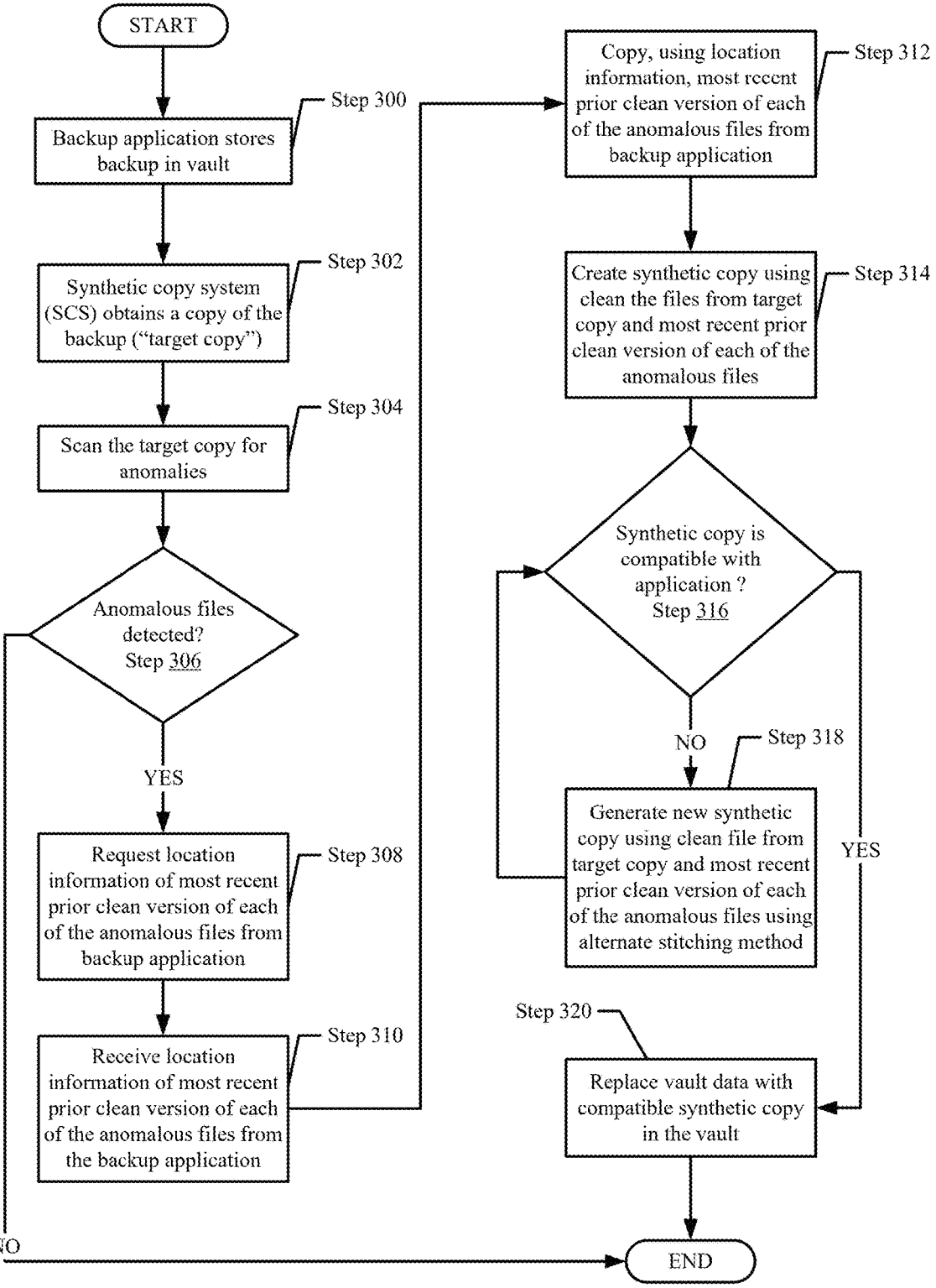
FIG. 3 shows a flowchart of a method for generating a synthetic copy in accordance with one or more embodiments of the invention.

Turning to FIG. 3, FIG. 3 shows a method for generating a synthetic copy in accordance with one or more embodiments of the invention. The method may be performed by, for example, a SCS (e.g., 106, FIG. 1). Other components in the system may perform this method without departing from the invention.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, a backup application (e.g., 104 in FIG. 1) stores a backup of the most recent application data in a vault (e.g., 102 in FIG. 1). It should be appreciated, that the backup of the application data may be a full backup or an incremental backup. It should be further appreciated that the backup application (e.g., 104 in FIG. 1) may retrieve the application data from an application running in a production host (e.g., 100 in FIG. 1). It should be further appreciated that the same backup application (e.g., 104 in FIG. 1) may be used to perform one or more of the steps discussed in FIG. 3.

In step 302, a SCS (e.g., 106 in FIG. 1) obtains a copy of the backup ("target copy") from the vault. It should be appreciated, that this may be facilitated by a CRO (e.g., 200 in FIG. 2).

In step 304, an ADE (e.g., 202 in FIG. 2) scans the target copy for anomalies (e.g., infections, corruptions, etc.). The result of this scan is zero or more anomalous application files. It should be appreciated, that any methods known in the art or discovered in the future may be used to scan the target copy.

In step 306, the ADE (e.g., 202 in FIG. 2) makes a determination, based upon the scan of the target data, about whether the target copy includes any anomalous files. Accordingly, if the result of the determination is YES, the method proceeds to step 308. If the result of the determination is NO, the process may end. It should be appreciated, that when no anomalies are detected, a synthetic copy is not needed because none of the application files include anomalies. Alternatively, a synthetic copy may be generated using the application data in the vault even when none of the application files includes anomalies.

In step 308, the CRO (e.g., 200 in FIG. 2) requests location information of the most recent prior clean (i.e., non-anomalous) version of each of the anomalous application files from the backup application (e.g., 104 in FIG. 1). The anomalous application files correspond to the files identified step 304.

In step 310, the CRO (e.g., 200 in FIG. 2) receives location information of the most recent prior clean version of each of the anomalous application files from the backup application (e.g., 104 in FIG. 1). As discussed above in FIG. 1, the backup application (e.g., 104 in FIG. 1) may maintain references to all of the application data in the vault (e.g., 102 in FIG. 1). In one or more embodiments, the backup application (e.g., 104 in FIG. 1) will retrieve the location information by rehydrating application data (e.g., metadata, application files, etc.) stored in the vault (e.g., 102 in FIG. 1) and providing the metadata (e.g., file paths) to the CRO (e.g., 200 in FIG. 2). It should be appreciated, that the rehydrated application data may include at least one prior incremental backup of the application data and/or at least one prior full backup of the application data. It should be further appreciated that the number of prior backups of the application data may depend on the retention policy of the vault (e.g., 102 in FIG. 1) and how often the application data is backed up in the vault (e.g., 102 in FIG. 1). It should be further appreciated, that the combination of at least two incremental backups of the application data or the combination of at least one incremental backup of the application data and at least one full backup of the application data may include at least one prior clean version of each of the anomalous application files.

In step 312, the CRO (e.g., 200 in FIG. 2) copies, using the location information, the most recent prior clean versions of each of the anomalous application files using the backup application (e.g., 104 in FIG. 1) onto a recovery sandbox (e.g., 204 in FIG. 2). If the synthetic copy is determined to be not compatible with the application as described below in step 316, the CRO (e.g., 200 in FIG. 2) may obtain prior clean versions of the anomalous application files from older application backups. As described above the recovery sandbox (e.g., 204 in FIG. 2) may utilize temporary storage (e.g., 206 in FIG. 2) to temporarily store copies most recent prior clean version of each of the anomalous application files until the CRO (200 in FIG. 2) stitches them as described below in step 314.

In step 314, the CRO (e.g., 200 in FIG. 2) generates a synthetic copy by patching the most recent prior clean versions of each of the anomalous application files over the anomalous application files and stitching them with clean application files from the target copy. It should be appreciated that the synthetic copy may be generated on the recovery sandbox (e.g., 204 in FIG. 2). It should be appreciated that any stitching methods known in the art or discovered in the future may be used to generate the synthetic copy. The following are examples of stitching methods that may be used to generate the synthetic copy:

$$\text{Synthetic Copy} = \text{copy with anomalous application files} -$$
$$\text{all anomalous application files} + \text{most recent prior}$$
$$\text{clean version of each of the anomalous application files}$$
$$\text{Synthetic Copy} =$$
$$\text{most recent clean application files} + \text{most recent prior clean}$$
$$\text{version of each of the anomalous application files}$$

In step 316, the CRO (e.g., 200 in FIG. 2) determines whether the synthetic copy is compatible with the application (i.e., a compatible synthetic copy). In one or more embodiments, the capability test may be performed in the recovery sandbox (e.g., 204 in FIG. 2). It should be appreciated, that any method known in the art or discovered in the future may be used to make this determination. It should be further appreciated, that the method used may be application-specific and that in some scenarios, the application files may be associated with different applications. Thus, before the synthetic copy can be verified, the CRO (e.g., 200 in FIG. 2) may determine the file types of the application files in the synthetic copy and their corresponding applications. For example, if one or more application files from the synthetic copy are from an application run in a Kernel-based Virtual Machine (KVM), those application files need to be deployed in a KVM environment to test if they are compatible with the application. In the above example, the KVM environment may be deployed in the recovery sandbox (e.g., 204 in FIG. 2). It should be appreciated, that this may be repeated for all of the application files in the synthetic copy. Accordingly, if the result of this determination is YES, the method proceeds to step 320. If the result of the determination is NO, the method proceeds to step 318.

In step 318, when the synthetic copy is not compatible with the application, the CRO (e.g., 200 in FIG. 2) generates a new synthetic copy using a new stitching method. As discussed above in step 314, the CRO (e.g., 200 in FIG. 2) may use prior clean versions of the anomalous application files from older application data backups to generate the synthetic copy. The method then proceeds to step 316. Steps 316-318 are performed until the CRO (e.g., 200 in FIG. 2) determines that the synthetic copy is compatible.

In step 320, the backup of the most recent application data in the vault (e.g., 102 in FIG. 1) is replaced with a compatible synthetic copy. It should be appreciated, that this process may be repeated every time the application data is backed up, according to a set backup schedule, or when predetermined conditions are met.

In one or more embodiments, the method may end following step 320.

Figure 4:
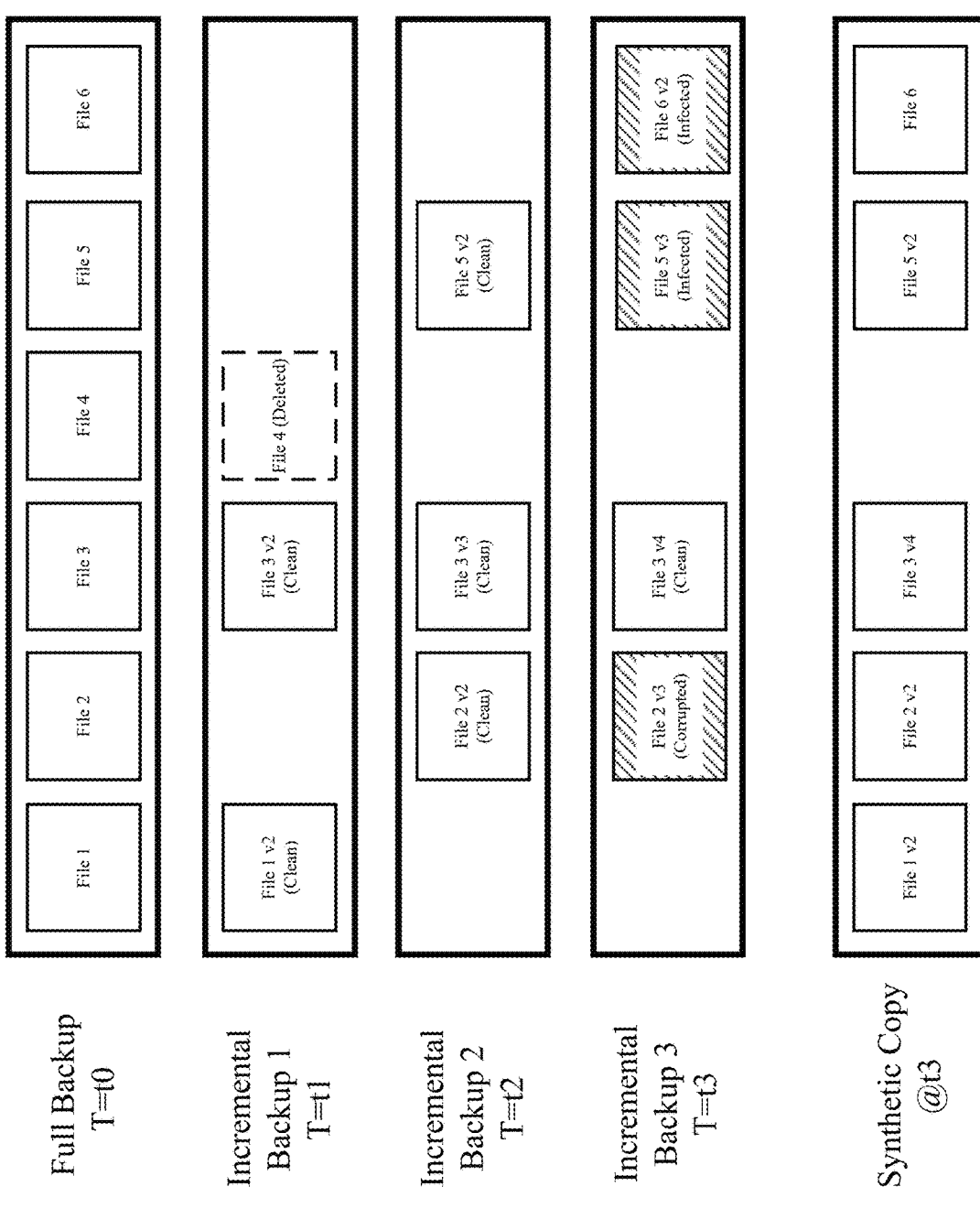
FIG. 4 shows an exemplary scenario in accordance with one or more embodiments of the invention.

Turning to FIG. 4, FIG. 4 shows an exemplary scenario in accordance with one or more embodiments of the invention. FIG. 4 is included only to explain various embodiments of the invention and is not intended to limit the scope of the invention.

Turning to the example, in this example, backups of application data are present between T=t0–t3. The backup at T=t0 is a full back while the backups at T=t1–t3 are incremental backups. For the purposes of this example, it should be assumed that the backups at T=t0–t1 are locked in a vault (e.g., 102 in FIG. 1). It should be further assumed that a synthetic copy is being generated at T=t3. A synthetic copy may be generated in accordance with the steps shown in FIG. 3 as follows:

1. First, (e.g., step 300 in FIG. 3) a backup application (e.g., 104 in FIG. 1) stores a backup of the most recent application data in a vault (e.g., 102 in FIG. 1). Here, because T=t3 is an incremental backup, the most recent application data will include application files from different backups. Here, the most recent application data includes File 1 v2 from the backup at T=t1 and File 2 v3, File 3 v4, File 5 v3, and File 6 v2 from the backup at T=t3.

2. Second, (e.g., step 302 in FIG. 3) an SCS (e.g., 106 in FIG. 1) obtains a copy of the backup ("target copy") including, File 1 v2, File 2 v3, File 3 v4, File 5 v3, and File 6 v2.

3. Third, (e.g., step 304 in FIG. 3) an ADE (e.g., 202 in FIG. 2) scans File 1 v2, File 2 v3, File 3 v4, File 5 v3, and File 6 v2 for anomalies. Here, as shown in FIG. 4, the scan will show that File 1 v2 and File 3 v4 are clean but File 2 v3 is corrupted and File 5 v3, and File 6 v2 are infected.

4. Fourth, (e.g., step 306 in FIG. 3) based on the scan, the ADE (e.g., 202 in FIG. 2) will determine that the backup includes anomalous application files.

5. Fifth, (e.g., step 308 in FIG. 3) a CRO (e.g., 200 in FIG. 2) requests location data of the most recent prior clean version of each of the anomalous application files (i.e., infected application files, corrupted application files, etc.) from the backup application (e.g., 104 in FIG. 1). The backup application (e.g., 104 in FIG. 1) then obtains metadata and prior application files from the vault (e.g., 102 in FIG. 1). Here, the metadata specifies that the prior application files are located in T=t0–t3 and that the most recent prior clean version of each of the anomalous application files are, File 2 v2 for File 2 v3, File 5 v2 for File 5 v3, and File 6 for File 6 v2. It should be appreciated, that depending on the vault's (e.g., 102 in FIG. 1) retention policy, there may be more prior clean application files available.

6. Sixth, (e.g., step 310 in FIG. 3) the CRO (e.g., 200 in FIG. 2) receives location information of the most recent prior clean version of each of the anomalous application files from the backup application (e.g., 104 in FIG. 1).

7. Seventh, (e.g., step 312 in FIG. 3) the CRO (e.g., 200 in FIG. 2) copies of the most recent prior clean versions of each of the anomalous application files (i.e., File 2 v2, File 5 v2, and File 6) are obtained using the backup application (e.g., 104 in FIG. 1) and stored onto a recovery sandbox (e.g., 204 in FIG. 2).

8. Eighth, (e.g., step 314 in FIG. 3) the CRO (e.g., 200 in FIG. 2) generates a synthetic copy by patching the anomalous application files with their most recent prior clean versions and then, stitching them with the clean application files from the target copy. Here, File 2 v3 is patched with File 2 v2, File 5 v3 is patched with File 5 v2, and File 6 v2 is patched with File 6. Then, File 2 v2, File 5 v2, and File 6 are stitched with File 1 v2 and File 3 v4 to create the synthetic copy shown at t3.

9. Ninth, (e.g., step 316 in FIG. 3) the CRO (e.g., 200 in FIG. 2) determines whether the synthetic copy is compatible with the application. Here, for example, the CRO (e.g., 200 in FIG. 2) may determine that File 2 v2 is not compatible with the applications.

10. Tenth, (e.g., step 318 in FIG. 3) the CRO (e.g., 200 in FIG. 2) generates a new synthetic copy using a new stitching method. The new synthetic copy may be generated by patching infected file 2 v3 with File 2 instead of File 2 v2. Then the new synthetic copy is run through the compatibility test.

11. Eleventh, (e.g., step 320 in FIG. 3) a compatible synthetic copy (i.e., File 1 v2, File 2, File 3 v4, File 5 v2, and File 6) is stored in the vault (e.g., 102 in FIG. 1).

Figure 5:
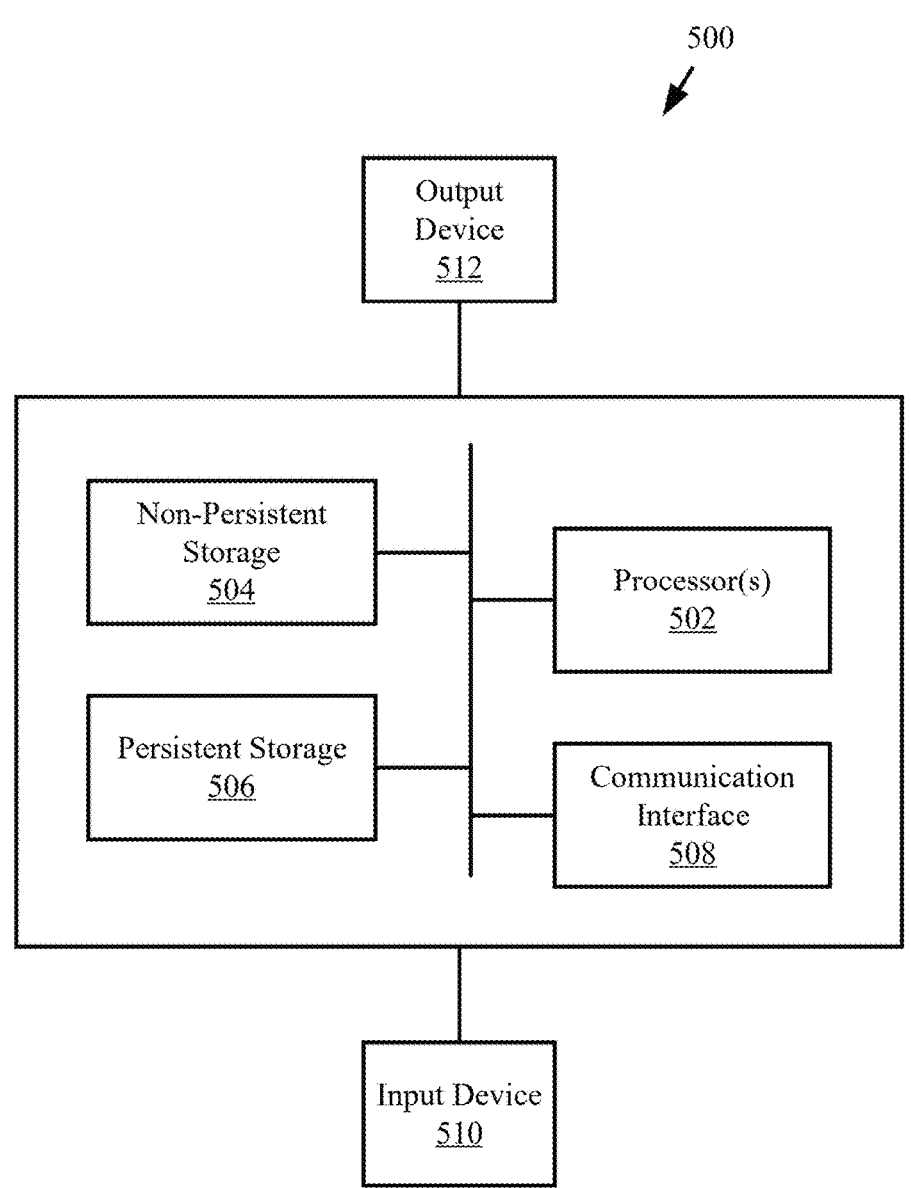
FIG. 5 shows a diagram of a computing system in accordance with one or more embodiments of the invention.

Embodiments of the disclosure may be implemented using computing devices. Turning to FIG. 5, FIG. 5 shows a diagram of a computing device (500) in accordance with one or more embodiments. The computing device (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (512), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. The communication interface (508) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (510, 512) may be locally or remotely connected to the computer processor(s) (502), non-persistent storage (504), and persistent storage (506). Many diverse types of computing devices exist, and the aforementioned input and output device(s) (510, 512) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments will now be described with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the prior description of the figures, any component described with regard to a figure, in various embodiments of the invention, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection.

Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating synthetic copies of data associated with an application, the method comprising:
    making a first determination that a first copy of the data comprises:
        a first anomalous file,
        a second anomalous file, and
        a plurality of non-anomalous files;
    in response to the first determination:
        obtaining first file location information of a most recent prior clean version of the first anomalous file, wherein the first file location information includes a first file path;
        obtaining, following obtaining the first file location information, second file location information of a most recent prior clean version of the second anomalous file, wherein the second file location information includes a second file path;
        obtaining, using the first file path, the most recent prior clean version of the first anomalous file from a backup application, wherein the most recent prior clean version of the first anomalous file is associated with a first backup copy of the data;
        obtaining, using the second file path, the most recent prior clean version of the second anomalous file from the backup application, wherein the most recent prior clean version of the second anomalous file is associated with a second backup copy of the data;
    generating a first synthetic copy of the data using the most recent prior clean version of the first anomalous file, the most recent prior clean version of the second anomalous file, and the plurality of non-anomalous files;
    making a second determination that the first synthetic copy of the data is compatible with the application based on file types of the most recent prior clean version of the first anomalous file, the most recent prior clean version of the second anomalous file, and the plurality of non-anomalous files; and
    in response to the second determination, storing the first synthetic copy of the data in a vault,
    wherein the first copy of the data is obtained from the vault,
    wherein storing the first synthetic copy of the data replaces the first copy of the data in the vault.

2. The method of claim 1, further comprising:
    making a third determination that a second copy of the data comprises:

a third anomalous file, a fourth anomalous file, and a second plurality of non-anomalous files;

in response to the third determination:

obtaining third file location information of a most recent prior clean version of the third anomalous file, wherein the third file location information includes a third file path;

obtaining, following obtaining the third file location information, fourth file location information of a most recent prior clean version of the fourth anomalous file, wherein the fourth file location information includes a fourth file path;

obtaining, using the third file path, the most recent prior clean version of the third anomalous file from a second backup application, wherein the most recent prior clean version of the third anomalous file is associated with a third backup copy of the data;

obtaining, using the fourth path, the most recent prior clean version of the fourth anomalous file from the second backup application, wherein the most recent prior clean version of the fourth anomalous file is associated with a fourth backup copy of the data;

generating a second synthetic copy of the data using the most recent prior clean version of the third anomalous file, the most recent prior clean version of the fourth anomalous file, and the second plurality of non-anomalous files;

making a fourth determination that the second synthetic copy of the data is not compatible with the second application; and in response to the fourth determination, generating a third synthetic copy of the data using the most recent prior clean version of the third anomalous file, the most recent prior clean version of the fourth anomalous file, the second plurality of non-anomalous files, and a second stitching method, wherein the second synthetic copy of the data is generated using a first stitching method.

3. The method of claim 1, wherein the first copy of the data is part of a full backup, wherein the most recent prior clean version of the first anomalous file is part of a first incremental backup, wherein the most recent prior clean version of the second anomalous file is part of a second incremental backup.

4. The method of claim 1, wherein the first copy of the data is part of a first incremental backup, wherein the most recent prior clean version of the first anomalous file is part of a second incremental backup, wherein the most recent prior clean version of the second anomalous file is part of a full backup.

5. The method of claim 1, wherein the first anomalous file is an infected file.

6. The method of claim 1, wherein the first anomalous file is a corrupted file.

7. A non-transitory computer readable medium (CRM) comprising computer readable program code, which when executed by a computer processor, enables a computer to perform a method for generating synthetic copies of data associated with an application, the method comprising:

making a first determination that a first copy of the data comprises:

a first anomalous file, a second anomalous file, and a plurality of non-anomalous files;

in response to the first determination:

obtaining first file location information of a most recent prior clean version of the first anomalous file, wherein the first file location information includes a first file path;

obtaining, following obtaining the first file location information, second file location information of a most recent prior clean version of the second anomalous file, wherein the second file location information includes a second file path;

obtaining, using the first file path, the most recent prior clean version of the first anomalous file from a backup application, wherein the most recent prior clean version of the first anomalous file is associated with a first backup copy of the data;

obtaining, using the second file path, the most recent prior clean version of the second anomalous file from the backup application, wherein the most recent prior clean version of the second anomalous file is associated with a second backup copy of the data;

generating a first synthetic copy of the data using the most recent prior clean version of the first anomalous file, the most recent prior clean version of the second anomalous file, and the plurality of non-anomalous files;

making a second determination that the first synthetic copy of the data is compatible with the application based on file types of the most recent prior clean version of the first anomalous file, the most recent prior clean version of the second anomalous file, and the plurality of non-anomalous files; and in response to the second determination, storing the first synthetic copy of the data in a vault, wherein the first copy of the data is obtained from the vault, wherein storing the first synthetic copy of the data replaces the first copy of the data in the vault.

8. The non-transitory CRM of claim 7, the method further comprising:

making a third determination that a second copy of the data comprises:

a third anomalous file, a fourth anomalous file, and a second plurality of non-anomalous files;

in response to the third determination:

obtaining third file location information of a most recent prior clean version of the third anomalous file, wherein the third file location information includes a third file path;

obtaining, following obtaining the third file location information, fourth file location information of a most recent prior clean version of the fourth anomalous file, wherein the fourth file location information includes a fourth file path;

obtaining, using the third file path, the most recent prior clean version of the third anomalous file from a second backup application, wherein the most recent prior clean version of the third anomalous file is associated with a third backup copy of the data;

obtaining, using the fourth path, the most recent prior clean version of the fourth anomalous file from the second backup application, wherein the most recent prior clean version of the fourth anomalous file is associated with a fourth backup copy of the data;

generating a second synthetic copy of the data using the most recent prior clean version of the third anomalous file, the most recent prior clean version of the fourth anomalous file, and the second plurality of non-anomalous files;

making a fourth determination that the second synthetic copy of the data is not compatible with the second application; and in response to the fourth determination, generating a third synthetic copy of the data using the most recent prior clean version of the third anomalous file, the most recent prior clean version of the fourth anomalous file, the second plurality of non-anomalous files, and a second stitching method, wherein the second synthetic copy of the data is generated using a first stitching method.

9. The non-transitory CRM of claim 7, wherein the first copy of the data is part of a full backup, wherein the most recent prior clean version of the first anomalous file is part of a first incremental backup, wherein the most recent prior clean version of the second anomalous file is part of a second incremental backup.

10. The non-transitory CRM of claim 7, wherein the first copy of the data is part of a first incremental backup, wherein the most recent prior clean version of the first anomalous file is part of a second incremental backup, wherein the most recent prior clean version of the second anomalous file is part of a full backup.

11. The non-transitory CRM of claim 7, wherein the first anomalous file is an infected file.

12. The non-transitory CRM of claim 7, wherein the first anomalous file is a corrupted file.

13. A system for generating synthetic copies of data associated with an application hosted by composed information handling systems, the system comprising:

persistent storage; and a computing device, comprising a processor and memory, programmed to:

make a first determination that a first copy of the data comprises:

a first anomalous file, a second anomalous file, and a plurality of non-anomalous files;

in response to the first determination:

obtain first file location information of a most recent prior clean version of the first anomalous file, wherein the first file location information includes a first file path;

obtain, following obtaining the first file location information, second file location information of a most recent prior clean version of the second anomalous file, wherein the second file location information includes a second file path;

obtain, using the first file path, the most recent prior clean version of the first anomalous file from a backup application, wherein the most recent prior clean version of the first anomalous file is associated with a first backup copy of the data;

obtain, using the second file path, the most recent prior clean version of the second anomalous file from the backup application, wherein the most recent prior clean version of the second anomalous file is associated with a second backup copy of the data;

generate a first synthetic copy of the data using the most recent prior clean version of the first anomalous file, the most recent prior clean version of the second anomalous file, and the plurality of non-anomalous files;

make a second determination that the first synthetic copy of the data is compatible with the application based on file types of the most recent prior clean version of the first anomalous file, the most recent prior clean version of the second anomalous file, and the plurality of non-anomalous files; and in response to the second determination, store the first synthetic copy of the data in a vault, wherein the first copy of the data is obtained from the vault, wherein storing the first synthetic copy of the data replaces the first copy of the data in the vault.

14. The system of claim 13, wherein the computing device is further programmed to:

make a third determination that a second copy of the data comprises:

a third anomalous file, a fourth anomalous file, and a second plurality of non-anomalous files;

in response to the third determination:

obtain third file location information of a most recent prior clean version of the third anomalous file, wherein the third file location information includes a third file path;

obtain, following obtaining the third file location information, fourth file location information of a most recent prior clean version of the fourth anomalous file, wherein the fourth file location information includes a fourth file path;

obtain, using the third file path, the most recent prior clean version of the third anomalous file from a second backup application, wherein the most recent prior clean version of the third anomalous file is associated with a third backup copy of the data;

obtain, using the fourth path, the most recent prior clean version of the fourth anomalous file from the second backup application, wherein the most recent prior clean version of the fourth anomalous file is associated with a fourth backup copy of the data;

generate a second synthetic copy of the data using the most recent prior clean version of the third anomalous file, the most recent prior clean version of the fourth anomalous file, and the second plurality of non-anomalous files;

make a fourth determination that the second synthetic copy of the data is not compatible with the second application; and in response to the fourth determination, generate a third synthetic copy of the data using the most recent prior clean version of the third anomalous file, the most recent prior clean version of the fourth anomalous file, the second plurality of non-anomalous files, and a second stitching method, wherein the second synthetic copy of the data is generated using a first stitching method.

15. The system of claim 13, wherein the first copy of the data is part of a full backup, wherein the most recent prior clean version of the first anomalous file is part of a first incremental backup, wherein the most recent prior clean version of the second anomalous file is part of a second incremental backup.

16. The system of claim 13, wherein the first copy of the data is part of a first incremental backup, wherein the most recent prior clean version of the first anomalous file is part of a second incremental backup, wherein the most recent prior clean version of the second anomalous file is part of a full backup.

17. The system of claim 13, wherein the first anomalous file is an infected file.

\* \* \* \* \*